United States Patent
Andreae et al.

(10) Patent No.: US 10,913,610 B2
(45) Date of Patent: Feb. 9, 2021

(54) CONVEYOR ROLLER TURN

(71) Applicant: SST Systems, Inc., Sturgeon Bay, WI (US)

(72) Inventors: Bradley M. Andreae, Sturgeon Bay, WI (US); Anthony C. Scoville, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 0 days.

(21) Appl. No.: 16/844,966

(22) Filed: Apr. 9, 2020

(65) Prior Publication Data

US 2020/0324978 A1    Oct. 15, 2020

Related U.S. Application Data

(60) Provisional application No. 62/833,155, filed on Apr. 12, 2019.

(51) Int. Cl.
| | |
|---|---|
| *B65G 17/38* | (2006.01) |
| *B65G 17/32* | (2006.01) |
| *B65G 15/02* | (2006.01) |
| *B65G 21/20* | (2006.01) |
| *B65G 39/18* | (2006.01) |
| *B65G 13/11* | (2006.01) |
| *B65G 21/22* | (2006.01) |

(52) U.S. Cl.
CPC .......... *B65G 21/2054* (2013.01); *B65G 13/11* (2013.01); *B65G 21/22* (2013.01); *B65G 39/18* (2013.01)

(58) Field of Classification Search
CPC ...... B65G 133/11; B65G 17/22; B65G 17/38; B65G 21/22
USPC ................ 198/685, 686, 687, 800, 831, 838
See application file for complete search history.

(56) References Cited

U.S. PATENT DOCUMENTS

| | | | |
|---|---|---|---|
| 2,419,643 A | 4/1947 | Hudson | |
| 2,521,232 A | 9/1950 | Lashells | |
| 3,401,065 A | 9/1968 | Steinbrecher et al. | |
| 4,029,199 A * | 6/1977 | Reens .................... | B65G 17/20 198/683 |

(Continued)

OTHER PUBLICATIONS

SKF, "Extra large (XL) hybrid deep groove ball bearings from SKF—the basics", Technical Data Sheet, Nov. 2010 (2 pages).

(Continued)

*Primary Examiner* — Douglas A Hess
(74) *Attorney, Agent, or Firm* — Michael Best & Friedrich, LLP

(57) ABSTRACT

A conveyor roller turn for establishing a curved path for a conveyor chain includes a frame supporting a rail defining a curved conveyor path, and a roller body supported rotatably on the frame along the curved conveyor path. The roller body has an outside surface positioned to provide horizontal support to the conveyor drive chain. At least one bearing supports the roller body on the frame, the at least one bearing including: a plurality of ceramic rolling elements, an inner race supporting the plurality of ceramic rolling elements on a radial inner side of the bearing, an outer race supporting the plurality of ceramic rolling elements on a radial outer side of the bearing, and tungsten disulfide dry film lubricant on the ceramic rolling elements.

20 Claims, 7 Drawing Sheets

(56) References Cited

U.S. PATENT DOCUMENTS

| | | | |
|---|---|---|---|
| 4,405,042 A * | 9/1983 | Dehne | B61B 10/02 |
| | | | 198/687 |
| 4,792,244 A | 12/1988 | Yamashita et al. | |
| 5,102,239 A | 4/1992 | Momose et al. | |
| 5,284,394 A | 2/1994 | Lemelson | |
| 5,306,565 A | 4/1994 | Corbin et al. | |
| 5,361,890 A | 11/1994 | McDonald et al. | |
| 5,398,618 A | 3/1995 | McMullen | |
| 5,486,052 A | 1/1996 | Sibley et al. | |
| 5,857,556 A * | 1/1999 | Bonacorsi | B65G 17/20 |
| | | | 198/683 |
| 6,158,894 A | 12/2000 | Pujari et al. | |
| 6,257,397 B1 * | 7/2001 | Kilby | A21C 13/02 |
| | | | 198/800 |
| 6,880,469 B2 | 4/2005 | Frost | |
| 6,968,943 B2 * | 11/2005 | Kilby | A21C 13/02 |
| | | | 198/800 |
| 7,086,525 B2 * | 8/2006 | Kilby | A21C 13/02 |
| | | | 198/800 |
| 7,087,862 B1 | 8/2006 | Shaffer et al. | |
| 7,686,156 B2 * | 3/2010 | Tabler | B65G 35/063 |
| | | | 198/465.4 |
| 7,921,988 B2 | 4/2011 | Kozman et al. | |
| 8,162,129 B2 * | 4/2012 | Franz | B65G 47/5122 |
| | | | 198/475.1 |
| 8,559,824 B2 * | 10/2013 | McColloch | G02B 6/4249 |
| | | | 398/135 |
| 8,657,102 B2 * | 2/2014 | Krebs | A22C 21/0053 |
| | | | 198/680 |
| 8,965,185 B2 | 2/2015 | Doherty et al. | |
| 9,169,080 B2 | 10/2015 | Kverel | |
| 10,464,752 B2 * | 11/2019 | Iwata | B65G 17/086 |
| 2006/0210208 A1 | 9/2006 | Ota et al. | |
| 2019/0024704 A1 | 1/2019 | Dannoux et al. | |

OTHER PUBLICATIONS

Koyo, "EXSEV, Bearings and Ceramic Bearings, 7. Ceramic Balls 8. Grease-filled Bearings for Food Machinery", pp. 91-92, available at least as early as Dec. 2018.

* cited by examiner

CONVEYOR ROLLER TURN

CROSS-REFERENCE TO RELATED APPLICATIONS

This application claims priority to U.S. Provisional Patent Application No. 62/833,155, filed Apr. 12, 2019, the entire contents of which are incorporated by reference herein.

BACKGROUND

The present invention relates to conveyor systems, and more particularly to conveyor roller turns that support a conveyor chain and direct the chain around a turn, thus forming a curve or arc that changes the direction of the conveyor chain path.

SUMMARY

In one aspect, the invention provides a conveyor roller turn for establishing a curved path supporting a conveyor drive chain, the conveyor roller turn comprising a frame supporting a rail defining a curved conveyor path, and a roller including a roller body supported rotatably about an axis on the frame at a position along the curved conveyor path. The roller body has an outside surface positioned to provide horizontal support to the conveyor drive chain and a bearing supporting the roller body on the frame. The bearing includes a plurality of ceramic rolling elements, an inner race supporting the plurality of ceramic rolling elements on a radial inner side of the bearing, an outer race supporting the plurality of ceramic rolling elements on a radial outer side of the bearing, and tungsten disulfide dry film lubricant on the ceramic rolling elements.

In another aspect, the invention provides a conveyor roller turn for establishing a curved path supporting a conveyor drive chain, the conveyor roller turn comprising a frame supporting a rail defining a curved conveyor path, and a roller including a roller body supported rotatably about an axis on the frame at a position along the curved conveyor path. The roller body has an outside surface positioned to provide horizontal support to the conveyor drive chain. A plurality of bearings support the roller body on the frame, each of the plurality of bearings including inner and outer races, and a plurality of ceramic rolling elements forming a full complement of rolling elements, with no retainer separating adjacent ones of the plurality of ceramic rolling elements. The inner race supports the plurality of ceramic rolling elements on a radial inner side of the bearing, and the outer race supports the plurality of ceramic rolling elements on a radial outer side of the bearing. The roller further includes an inner hub positioned within the roller body such that the first bearing and the second bearing are arranged radially between an inside of the roller body and an outside of the inner hub.

In yet another aspect, the invention provides a conveyor roller turn for establishing a curved path supporting a conveyor drive chain, the conveyor roller turn comprising a frame supporting a rail defining a curved conveyor path, and a roller including a roller body and an inner hub positioned within the roller body. The roller is supported rotatably about an axis on the frame at a position along the curved conveyor path, the roller body having an outside surface positioned to provide horizontal support to the conveyor drive chain. Both of a first bearing and a second bearing are arranged radially between an inside of the roller body and an outside of the inner hub, each of the first and second bearings includes a plurality of ceramic rolling elements, an inner race supporting the plurality of ceramic rolling elements on a radial inner side of the bearing, and an outer race supporting the plurality of ceramic rolling elements on a radial outer side of the bearing. The inner hub is formed as a single integral piece spanning axially across the first and second bearings, and wherein the inner hub includes a radially-projected central rib configured to maintain an axial spacing between the first and second bearings. The first bearing is axially retained between the central rib of the inner hub and an integral end flange of the roller body.

BRIEF DESCRIPTION OF THE DRAWINGS

FIG. 1A is a cross-section of the portion of the conveyor system shown in FIG. 1.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
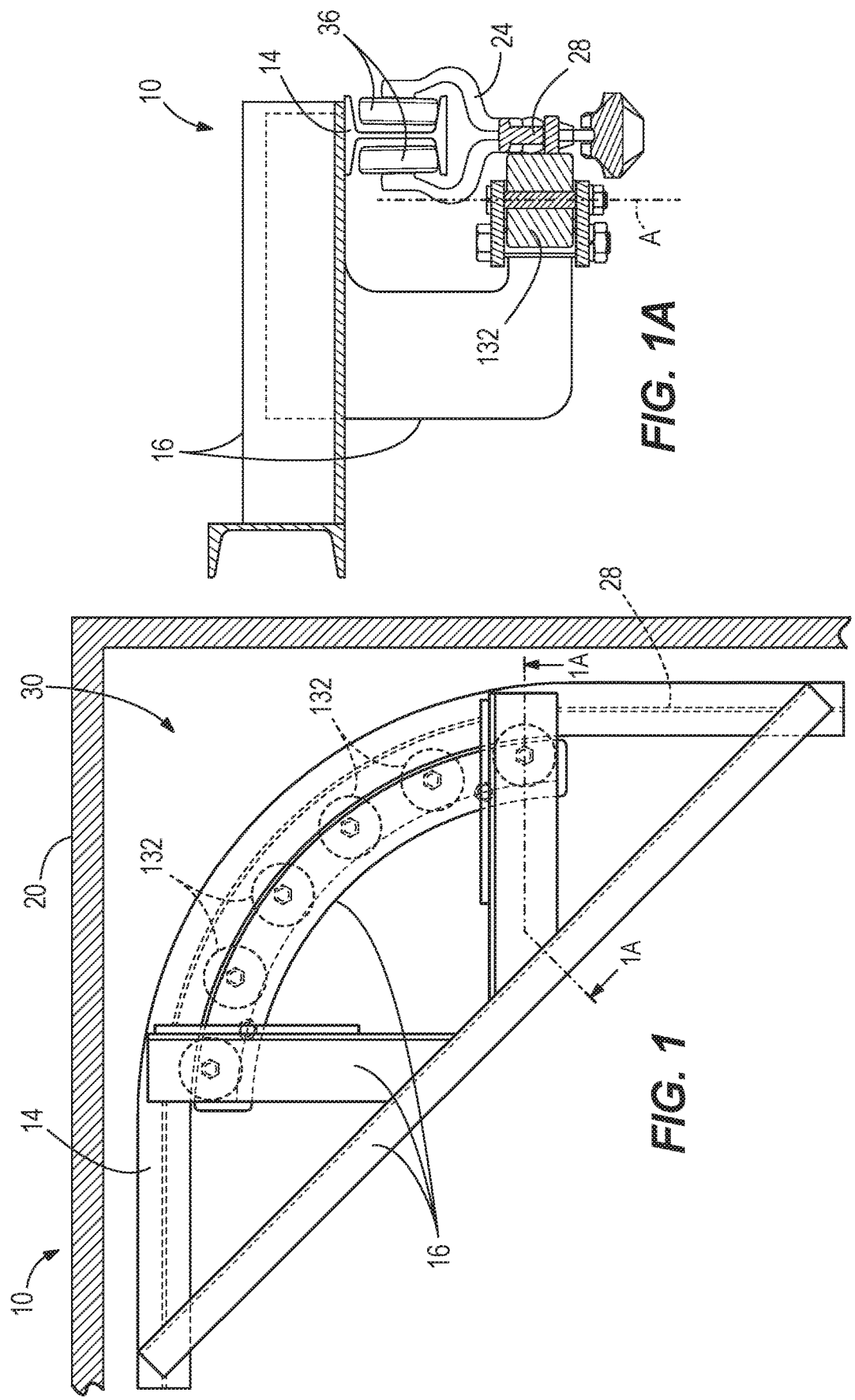
FIG. 1 is a plan view of a portion of a conveyor system, including a roller turn positioned within an industrial oven.
Figure 2:
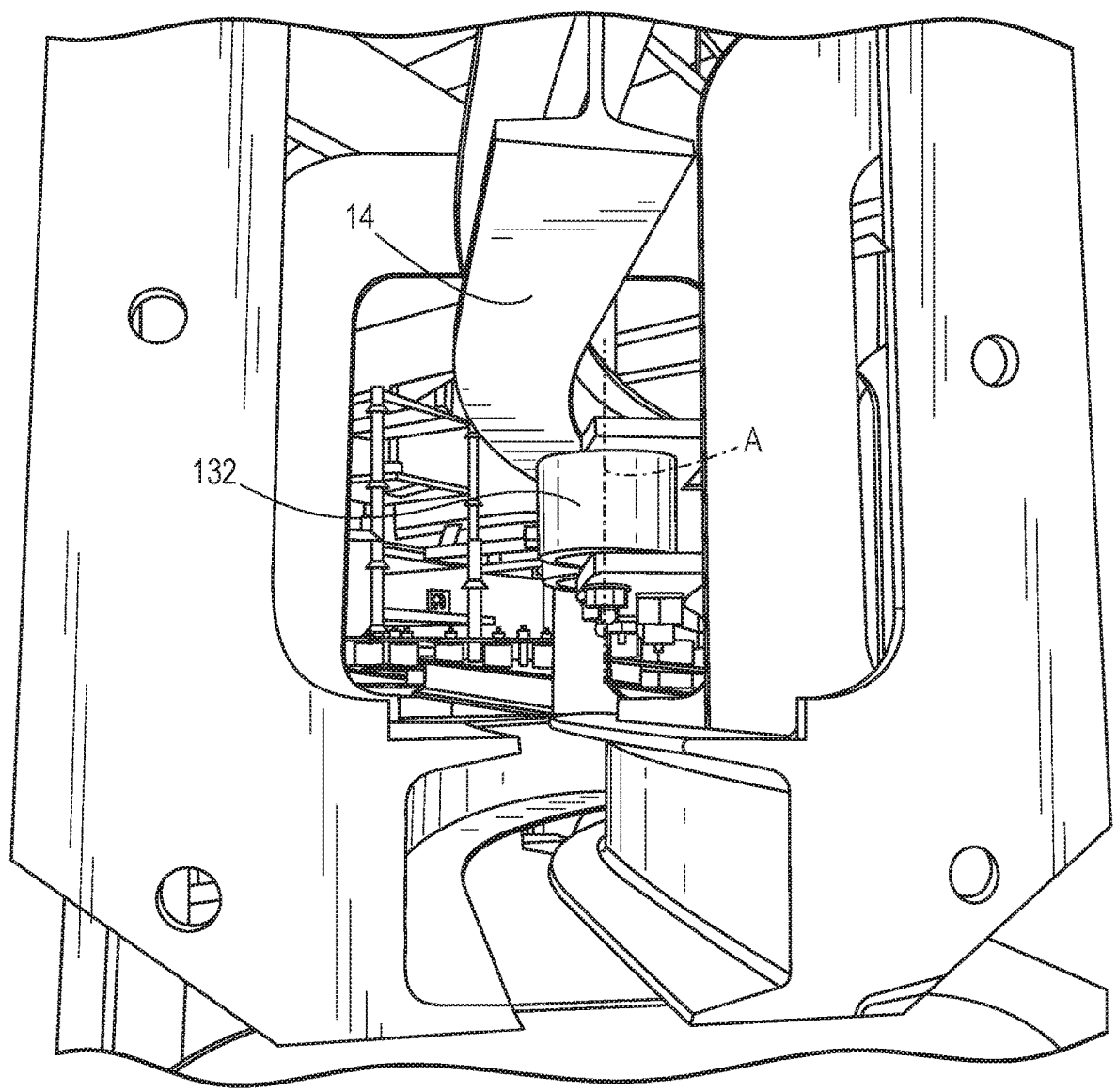
FIG. 2 is a perspective view of the roller turn.
Figure 3:
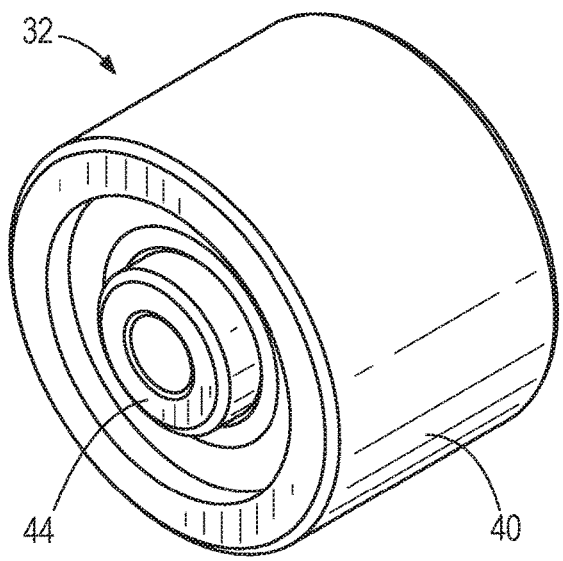
FIG. 3 is a perspective view of one roller of the roller turn according to one embodiment of the present disclosure.
Figure 4:
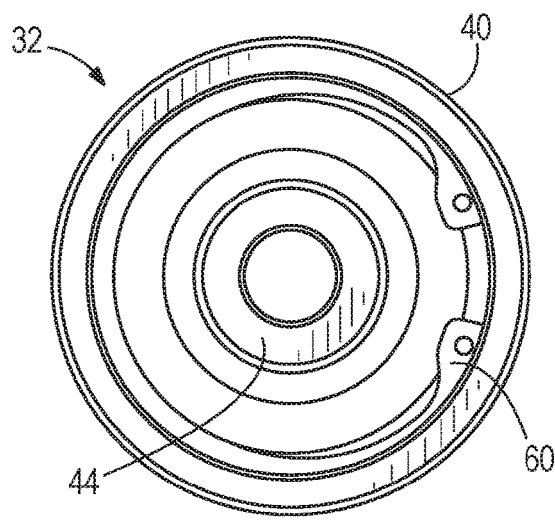
FIG. 4 is a first end view of the roller of FIG. 3.
Figure 5:
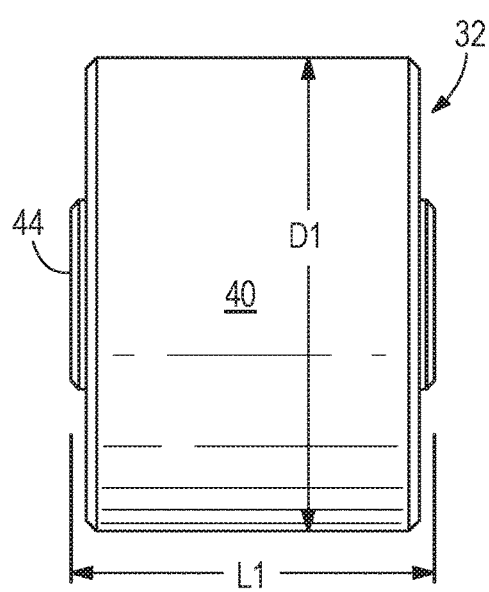
FIG. 5 is a side view of the roller of FIG. 3.
Figure 6:
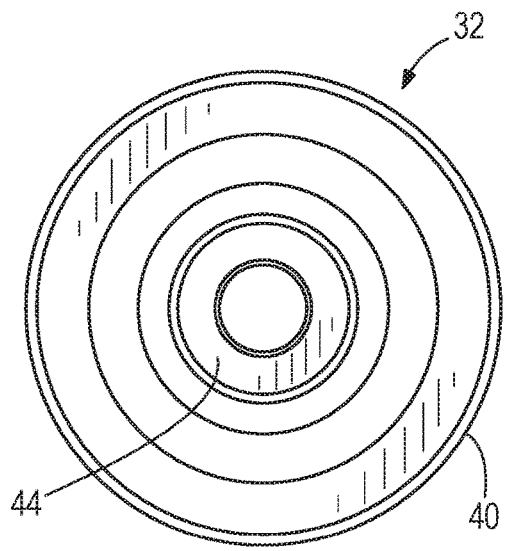
FIG. 6 is a second end view of the roller of FIG. 3.
Figure 7:
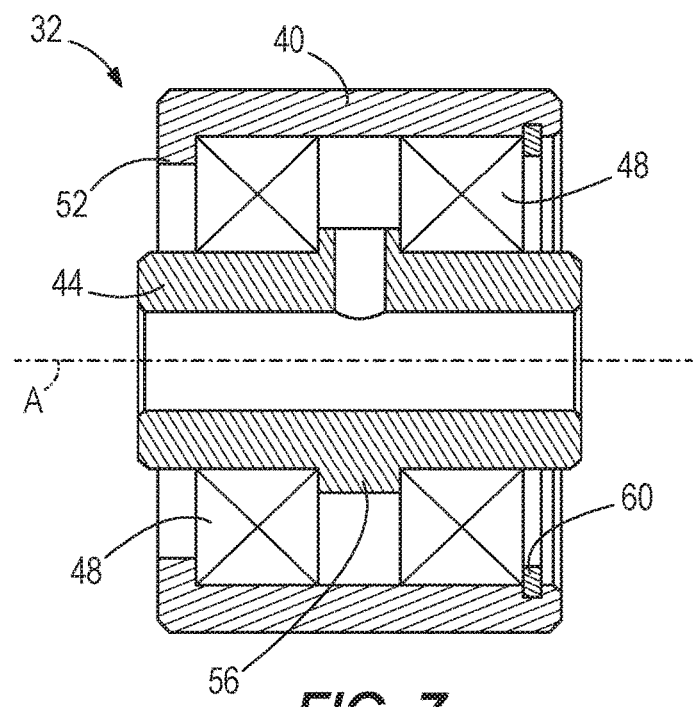
FIG. 7 is a cross-section of the roller of FIG. 3, taken along line A-A of FIG. 8.
Figure 8:
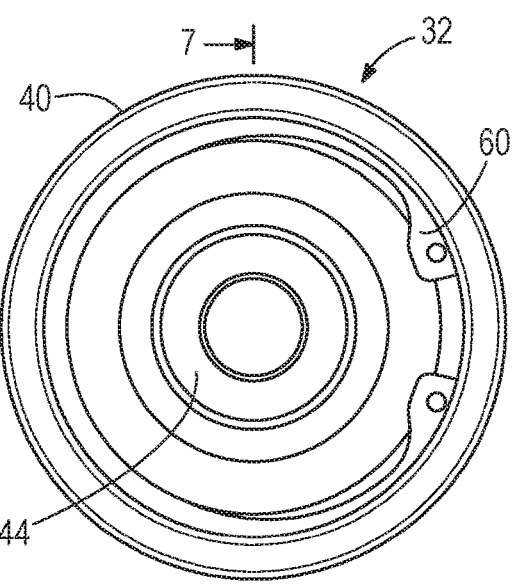
FIG. 8 is the first end view of FIG. 4, including the section line A-A.
Figure 9:
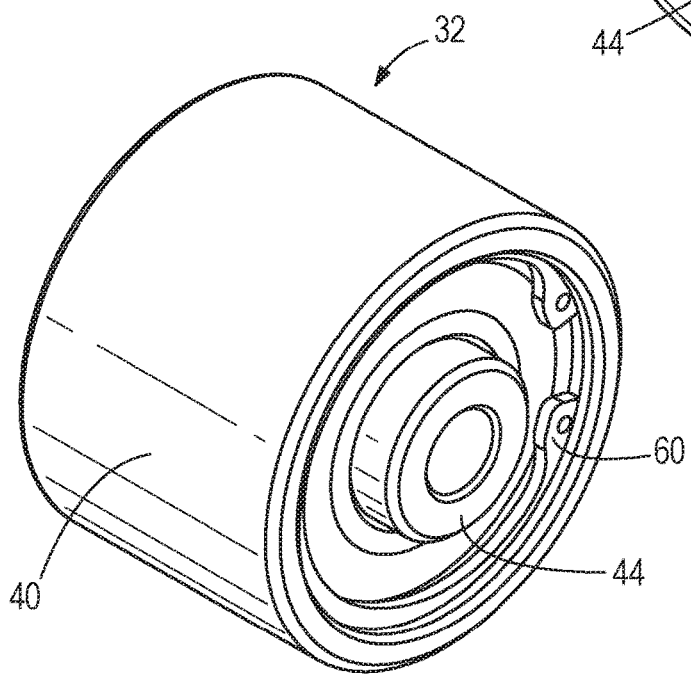
FIG. 9 is an alternate perspective view of the roller of FIG. 3.
Figure 10:
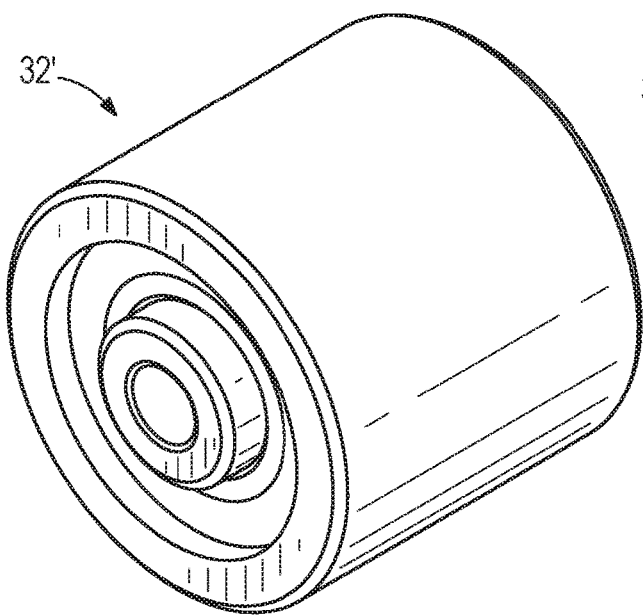
FIGS. 10 to 16 are views of another roller turn roller, having alternate relative dimensions.
Figure 11:
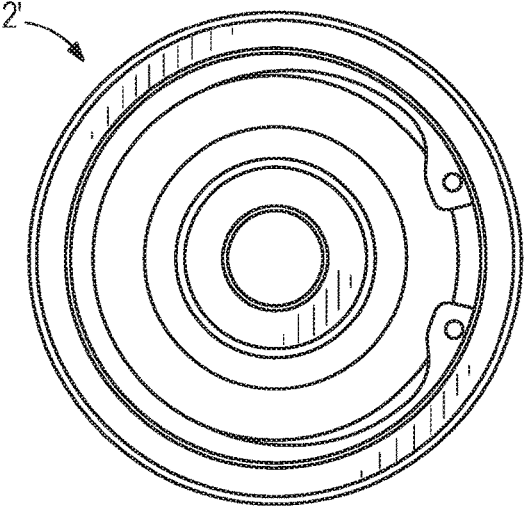
Figure 12:
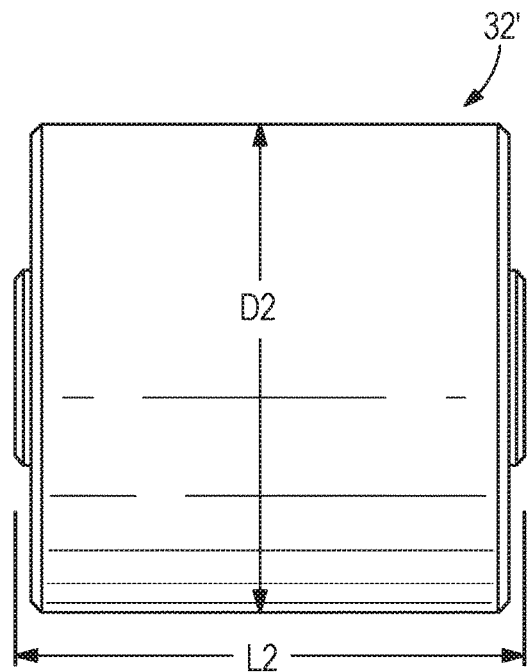
Figure 13:
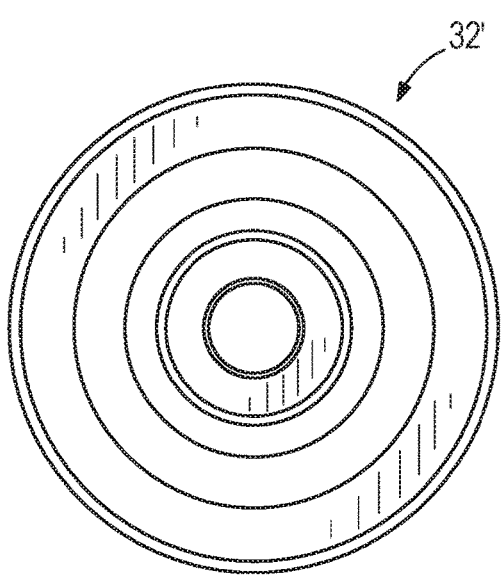
Figure 14:
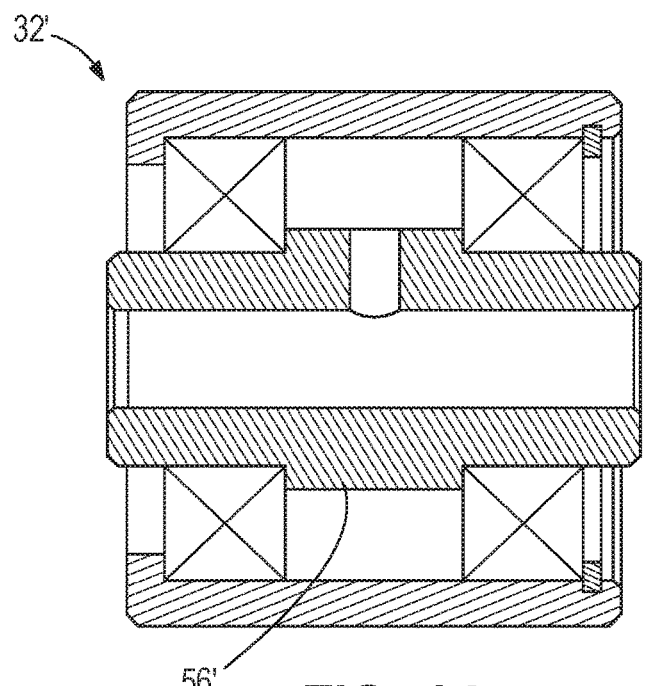
Figure 15:
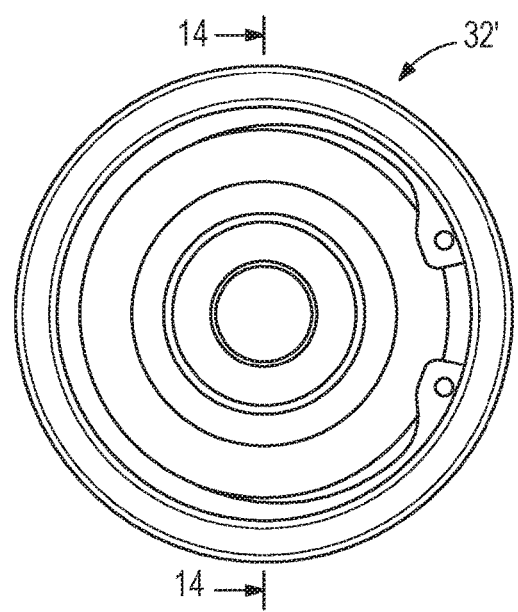
Figure 16:
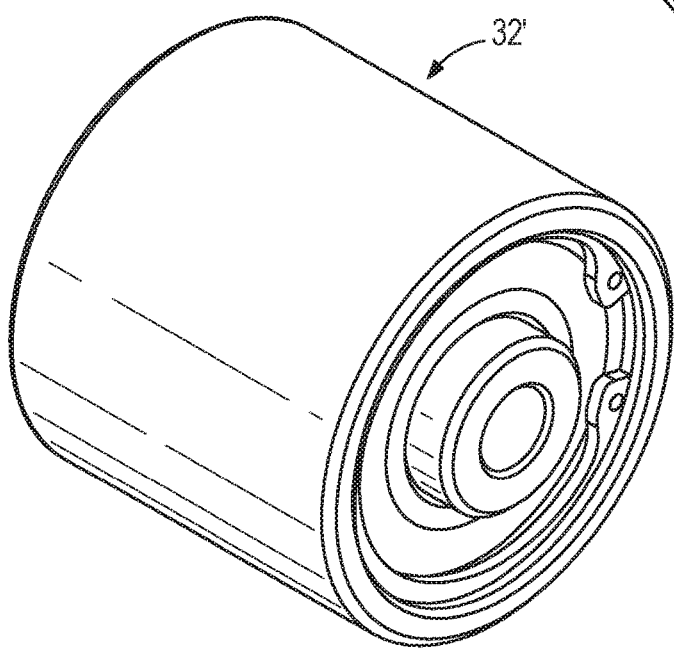
Figure 17:
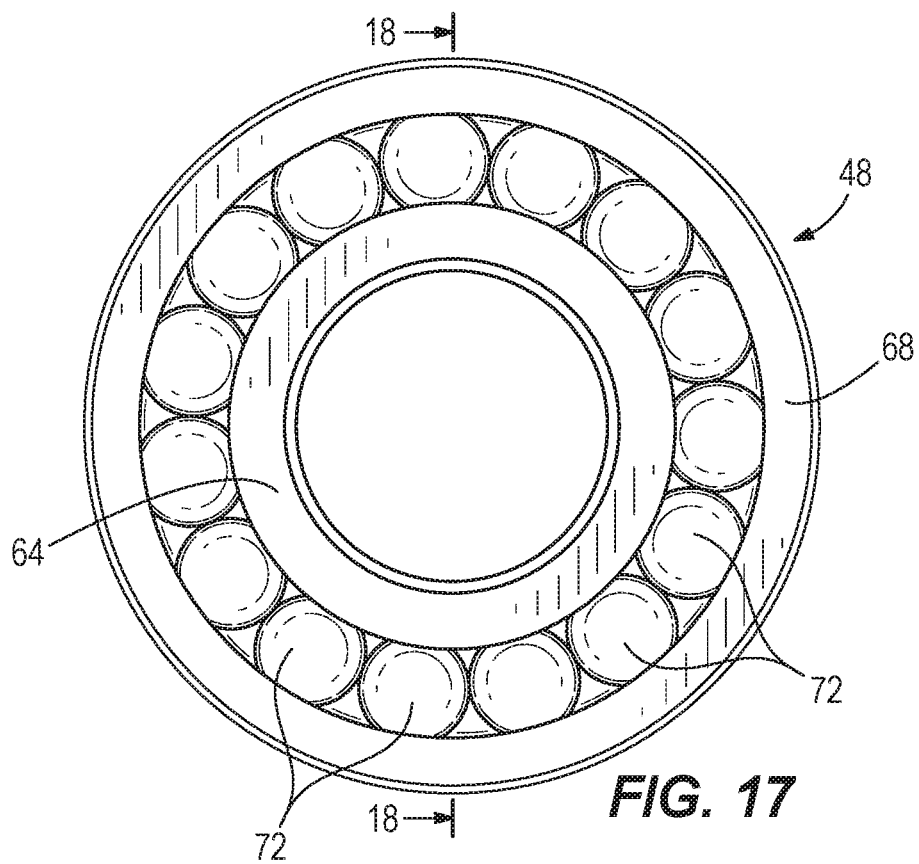
FIG. 17 is an end view of a ball bearing of the roller turn roller, having a full ball complement.
Figure 18:
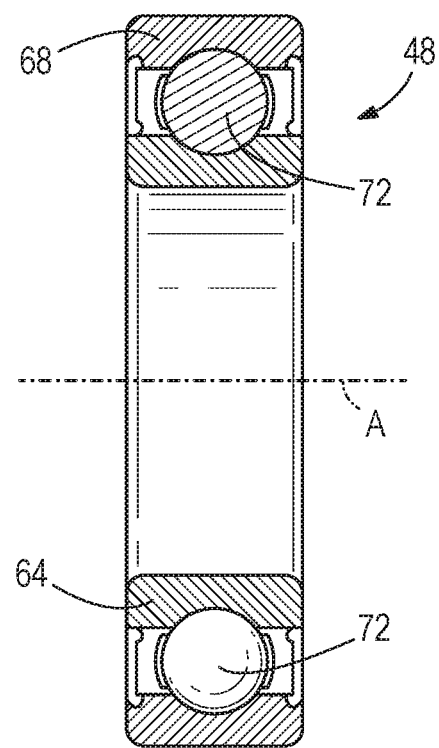
FIG. 18 is a cross-section view of the bearing of FIG. 17, showing a single inner race and a single outer race.

As part of a conveyor system 10 shown in FIGS. 1 and 2, a conveyor rail 14 is supported by a frame 16. The rail 14 extends through an industrial oven 20, and the oven 20 may define one of a plurality of workstations along the conveyor path. The conveyor system 10 can be an overhead conveyor in which the rail 14 supports multiple carrier assemblies 24 or "trolleys" that are moved along the conveyor rail 14 by an endless power transmission element, referred to hereinafter as the chain assembly or conveyor chain 28. As illustrated, the conveyor system 10 is a monorail system or I-beam conveyor in which the links of the conveyor chain 28 are integrated or secured with the trolleys 24, so that the various trolleys 24 are all linked together and form a chain assembly. In other constructions, the conveyor system 10 can be a power and free conveyor system in which an additional rail adjacent the chain rail 14 supports a plurality of unlinked or "free" trolleys for supporting workpieces. Although not shown, one or more motors pull the conveyor chain 28, along with the trolleys 24 and any supported workpieces along the rail 14. Various workstations along the conveyor system 10 can include manufacturing processes, such as dipping, painting, drying, assembling, or otherwise modifying a workpiece or assembly of workpieces. The oven 20 for example provides a drying or curing workstation for drying or curing a coating applied to the workpieces at one or more upstream workstations. The workpieces can be manufactured goods of metal, plastic, or wood onto which a coating of some type is applied as part of a finishing system prior to sale of goods to an intermediate or end user. The coating(s) may require a drying or curing process in order to properly ready the goods for final assembly, packaging, or sale. The coatings can be thermally cured coatings, which are heated in a cure oven, such as the oven 20, defining an oven chamber 30. The oven chamber 30 can be heated with steam, electrically generated heat, or a combustion-generated heat, although any number of alternate heat sources can also be utilized, including for example solar or geothermal energy. The oven chamber 30 may be heated to at least 100 degrees Celsius, and in some constructions at least 200 degrees Celsius, or at least 300 degrees Celsius. In some constructions, the oven chamber 30 may be heated to a temperature up to 538 degrees Celsius (1000 degrees Fahrenheit).

As shown in plan view in FIG. 1 and in section in FIG. 1A, the conveyor system 10 includes a roller turn including a plurality of rollers 132, the outer surfaces of which form "guides" to ensure the conveyor chain 28 follows the intended path around a horizontal turn. In this type of turn, "support" and "guide" are referring to the horizontal plane, resisting the forces induced by tension in the conveyor chain 28. Meanwhile, support in the vertical plane is performed by separate rollers 36 incorporated into the trolleys 24. Thus, as shown in FIGS. 1A and 2, each roller turn roller 132 is supported on a vertical central rotation axis A by a support rod (FIG. 1A), and the various axes A of the various rollers 32 are parallel to each other and spaced along an arc or other curve defined by the roller turn so as to define a change of course of the conveyor path within the horizontal plane. The example shown forms a 90-degree turn as shown in FIG. 1. The frame 16 of the roller turn supports each one of the rollers 132 (e.g., on a fixed vertical shaft). As will be apparent from the above description, the roller turn, including the rollers 132 is provided at a fixed position along the conveyor path, and as such the rollers 132 do not traverse out of the oven chamber 30 to a cooler environment where they may be periodically lubricated by lubricant spray from an auto-lubricator. Rather, the rollers 132 of the roller turn are continuously retained in the heated environment of the oven chamber 30 during operation.

Although conventional rollers 132 may include a simple graphite bushing to support rotation of the roller 132 on the support rod, these rollers 132 may be replaced with rollers 32, either in construction of a new conveyor roller turn similar to that shown in FIGS. 1-2, or even as a direct replacement, an upgrade retrofit, for the rollers 132. As shown in FIGS. 3-9, each roller 32 is an assembly of several parts, including an outer body 40 and an inner hub 44 rotatably supporting the outer body 40. Each one of the outer body 40 and the inner hub 44 is formed as a single integral piece so as to be monolithic as opposed to assembled from a plurality of components. As illustrated, the inner hub 44 has a length longer than a length of the outer body 40 as measured along the central axis A. Further, the inner hub 44 protrudes from the outer body 40 on both ends. The outer body 40 has the outer surface directly providing the guidance and support to the conveyor chain 28 by direct contact therewith. The outer body 40 is rotatably supported by one or more bearings 48 supported on the inner hub 44. As shown, there are two separate bearings 48 rotatably supporting the outer body 40 on the inner hub 44. A first of these bearings 48 is axially positioned between an end flange 52 of the outer body 40 and a central radially-protruding rib 56 of the inner hub 44, and the second bearing 48 is axially positioned between the central rib 56 and a retaining clip 60 secured in a groove of the outer body 40. The axial spacing between the bearings 48 is set by the axial length of the rib 56. FIGS. 10-16 illustrate a roller 32' of an alternate construction having an overall extended axial length compared to the roller 32 of FIGS. 3-9, the overall extended axial length attributed to an axially extended rib 56 and bearing spacing as compared to the roller 32 of FIGS. 3-9. In particular, the first roller 32 has a diameter D1 and an axial length L1, and the diameter D1 is greater than the axial length L1. In the case of the second roller 32', the diameter D2 and the axial length L2 are approximately equal (e.g., the axial length L2 is within +/−5 percent of the diameter D2).

Each of the bearings 48 can be a rolling element bearing having an inner race 64, an outer race 68 and a plurality of rolling elements 72 (e.g., balls or cylindrical rollers) positioned between the inner and outer races 64, 68. The rolling elements 72 can form a full complement, which, as known in the bearing arts, provides the bearing 48 without a retainer spacing adjacent rolling elements apart from each other. In some constructions, the inner and outer races 64, 68 are constructed of ground steel. Both the inner and outer races 64, 68 can have a one-piece integral construction, rather than a two-piece split design. As such, neither race 64, 68 includes a seam formed by the joint or gap between multiple separate sections. Each race 64, 68 thus provides a continuous, uninterrupted guide surface for the rolling elements 72, and there is no seam therein. The rolling elements 72 in each bearing 48 can be of ceramic material construction (e.g., silicon nitride). The rolling elements 72 can be lubricated with tungsten disulfide dry film lubricant, which the inventors have discovered provides excellent friction resistance for the ceramic rolling elements 72 at high temperatures (e.g., within oven chamber environments), particularly when used in conjunction with the one-piece ground steel inner race 63 and/or the one-piece ground steel outer race 68 as described above, and in some embodiments with enhanced longevity resulting from the full complement structure defined by the rolling elements 72 as also described above. This stands in contrast to conventional systems utilizing bearings having ceramic rolling elements for demanding applications such as high-speed environments (e.g., in which the ceramic rolling elements can be exposed to elevated temperatures resulting from high rotational speeds). Conventional bearings with ceramic rolling elements commonly utilize gel lubricant injected into the bearings upon manufacture, but have limited lifespans when exposed to elevated temperatures.

Due to the construction in which the outer body 40 has a radially-inward projecting end flange 52 at only one axial end thereof, the assembly process can include the steps of inserting a first one of the bearings 48 (e.g., full complement ceramic rolling element bearing) into the empty outer body 40 from the end opposite the end flange 52, followed by inserting the inner hub 44 until a first side of the central rib 56 abuts the inserted first bearing 48, followed by inserting a second one of the bearings 48 (e.g., full complement ceramic rolling element bearing) to abut a second side of the central rib 56, followed by applying an axial retention device (C-shaped "circlip" retaining clip 60 or other type) to the outer body 40. To receive the retaining clip 60, the outer body can be formed with a shallow groove in the interior bore adjacent the end opposite the end flange 52. In some constructions, the rollers 32, 32' may be assembled as part of a retrofit of an existing roller turn having graphite bushings rather than rolling element bearings. An inner bore of the inner hub 44 can be sized to allow direct replacement for the conventional bushing-supported rollers on the roller turn frame 16.

What is claimed is:

1. A conveyor roller turn for establishing a curved path supporting a conveyor drive chain, the conveyor roller turn comprising:
    a frame supporting a rail defining a curved conveyor path;
    a roller including a roller body supported rotatably about an axis on the frame at a position along the curved conveyor path, the roller body having an outside surface positioned to provide horizontal support to the conveyor drive chain; and
    a bearing supporting the roller body on the frame, the bearing including:
        a plurality of ceramic rolling elements,
        an inner race supporting the plurality of ceramic rolling elements on a radial inner side of the bearing,
        an outer race supporting the plurality of ceramic rolling elements on a radial outer side of the bearing, and
        tungsten disulfide dry film lubricant on the ceramic rolling elements.

2. The conveyor roller turn of claim 1, wherein each of the inner and outer bearing races is constructed with a ground steel rolling element support surface.

3. The conveyor roller turn of claim 1, wherein the plurality of ceramic rolling elements form a full complement of rolling elements, with no retainer separating adjacent ones of the plurality of ceramic rolling elements.

4. The conveyor roller turn of claim 1, wherein each of the inner and outer bearing races is formed as a single piece having an uninterrupted guide surface for the plurality of ceramic rolling elements.

5. The conveyor roller turn of claim 1, wherein the bearing supporting the roller body on the frame is a first bearing, the conveyor roller turn further comprising a second bearing supporting the roller body on the frame, the second bearing including:
    a plurality of ceramic rolling elements,
    an inner race supporting the plurality of ceramic rolling elements on a radial inner side of the second bearing,
    an outer race supporting the plurality of ceramic rolling elements on a radial outer side of the second bearing, and
    tungsten disulfide dry film lubricant on the ceramic rolling elements.

6. The conveyor roller turn of claim 5, wherein the roller further comprises an inner hub positioned within the roller body such that the first bearing and the second bearing are arranged radially between an inside of the roller body and an outside of the inner hub.

7. The conveyor roller turn of claim 6, wherein the inner hub is formed as a single integral piece spanning a majority of a length of the roller body measured along the axis.

8. The conveyor roller turn of claim 7, wherein the inner hub includes a radially-projected central rib configured to maintain an axial spacing between the first and second bearings.

9. The conveyor roller turn of claim 8, wherein the first bearing is axially retained between the central rib of the inner hub an integral end flange of the roller body.

10. The conveyor roller turn of claim 7, wherein the inner hub projects outward beyond first and second axial ends of the roller body.

11. An industrial finishing system including an oven, wherein the conveyor roller turn of claim 1 is provided at a fixed position inside the oven.

12. A conveyor roller turn for establishing a curved path supporting a conveyor drive chain, the conveyor roller turn comprising:
    a frame supporting a rail defining a curved conveyor path;
    a roller including a roller body supported rotatably about an axis on the frame at a position along the curved conveyor path, the roller body having an outside surface positioned to provide horizontal support to the conveyor drive chain; and
    a plurality of bearings supporting the roller body on the frame, each of the plurality of bearings including:
        a plurality of ceramic rolling elements forming a full complement of rolling elements, with no retainer separating adjacent ones of the plurality of ceramic rolling elements,
        an inner race supporting the plurality of ceramic rolling elements on a radial inner side of the bearing, and
        an outer race supporting the plurality of ceramic rolling elements on a radial outer side of the bearing,
    wherein the roller further includes an inner hub positioned within the roller body such that the first bearing and the second bearing are arranged radially between an inside of the roller body and an outside of the inner hub.

13. The conveyor roller turn of claim 12, wherein, in each of the plurality of bearings, each of the inner and outer bearing races is constructed with a ground steel rolling element support surface.

14. The conveyor roller turn of claim 12, wherein the plurality of ceramic rolling elements in each of the plurality of bearings is lubricated by tungsten disulfide dry film lubricant.

15. The conveyor roller turn of claim 12, wherein, in each of the plurality of bearings, each of the inner and outer bearing races is formed as a single piece having an uninterrupted guide surface for the plurality of ceramic rolling elements.

16. The conveyor roller turn of claim 12, wherein the inner hub is formed as a single integral piece spanning axially across the plurality of bearings.

17. The conveyor roller turn of claim 16, wherein the inner hub includes a radially-projected central rib configured to maintain an axial spacing between adjacent ones of the plurality of bearings.

18. The conveyor roller turn of claim 17, wherein one of the plurality of bearings is axially retained between the central rib of the inner hub and an integral end flange of the roller body.

19. An industrial finishing system including an oven, wherein the conveyor roller turn of claim 12 is provided at a fixed position inside the oven.

20. A conveyor roller turn for establishing a curved path supporting a conveyor drive chain, the conveyor roller turn comprising:
    a frame supporting a rail defining a curved conveyor path;
    a roller including a roller body and an inner hub positioned within the roller body, the roller supported rotatably about an axis on the frame at a position along the curved conveyor path, the roller body having an outside surface positioned to provide horizontal support to the conveyor drive chain; and
    a first bearing and a second bearing, both arranged radially between an inside of the roller body and an outside of the inner hub, each of the first and second bearings including:

a plurality of ceramic rolling elements,
an inner race supporting the plurality of ceramic rolling elements on a radial inner side of the bearing, and
an outer race supporting the plurality of ceramic rolling elements on a radial outer side of the bearing,
wherein the inner hub is formed as a single integral piece spanning axially across the first and second bearings, and wherein the inner hub includes a radially-projected central rib configured to maintain an axial spacing between the first and second bearings, and
wherein the first bearing is axially retained between the central rib of the inner hub and an integral end flange of the roller body.

* * * * *